US012412558B1

(12) United States Patent
Liang et al.

(10) Patent No.: US 12,412,558 B1
(45) Date of Patent: Sep. 9, 2025

(54) SOUND PRODUCING DEVICE AND METHOD

(71) Applicant: xMEMS Labs, Inc., Santa Clara, CA (US)

(72) Inventors: Jemm Yue Liang, Sunnyvale, CA (US); Hsi-Sheng Chen, Fremont, CA (US)

(73) Assignee: xMEMS Labs, Inc., Santa Clara, CA (US)

( * ) Notice: Subject to any disclaimer, the term of this patent is extended or adjusted under 35 U.S.C. 154(b) by 0 days.

(21) Appl. No.: 18/896,845

(22) Filed: Sep. 25, 2024

Related U.S. Application Data

(60) Provisional application No. 63/540,937, filed on Sep. 28, 2023.

(51) Int. Cl.

| | |
|---|---|
| ***H04R 19/00*** | (2006.01) |
| ***G10K 15/04*** | (2006.01) |
| ***H04R 1/34*** | (2006.01) |
| ***H04R 1/36*** | (2006.01) |
| ***H04R 7/04*** | (2006.01) |
| ***H04R 17/00*** | (2006.01) |
| ***H04R 19/02*** | (2006.01) |

(52) U.S. Cl.
CPC ........... *G10K 15/04* (2013.01); *H04R 19/005* (2013.01); *H04R 19/02* (2013.01)

(58) Field of Classification Search
CPC ...... G10K 15/04; H04R 19/005; H04R 19/02; H04R 19/00; H04R 9/06; H04R 17/00; H04R 17/005; H04R 1/1058; H04R 1/1016; H04R 1/1091; H04R 1/10; H04R 1/24; H04R 1/345; H04R 1/34; H04R 1/36; H04R 1/20; H04R 1/22; H04R 7/04; H04R 25/356; H04R 25/35; H04R 25/402; H04R 25/50; H04R 25/502; H04R 25/505; H04R 25/60; H04R 25/603; H04R 25/609; H04R 2201/003; H04R 2201/00; H04R 2217/03; H04R 2217/00
See application file for complete search history.

(56) References Cited

U.S. PATENT DOCUMENTS

| | | | | |
|---|---|---|---|---|
| 8,861,752 | B2 * | 10/2014 | Margalit | G10K 15/04 381/431 |
| 9,774,959 | B2 * | 9/2017 | Kupershmidt | G10K 15/04 |
| 9,866,948 | B2 * | 1/2018 | Margalit | H04R 17/00 |
| 9,913,048 | B2 * | 3/2018 | Margalit | H04R 19/02 |
| 10,034,098 | B2 * | 7/2018 | Kupershmidt | B81B 3/0021 |
| 10,123,126 | B2 * | 11/2018 | Margalit | H04R 1/24 |
| 10,284,961 | B2 * | 5/2019 | Margalit | H04R 19/005 |
| 10,779,088 | B1 * | 9/2020 | Liang | H03K 5/1565 |
| 11,172,310 | B2 * | 11/2021 | Liang | H04R 1/025 |

(Continued)

OTHER PUBLICATIONS

Carl Poldy, Headphones Fundamentals Tutorial AES 120, May 2006.*

*Primary Examiner* — Edgardo San Martin
(74) *Attorney, Agent, or Firm* — Winston Hsu

(57) ABSTRACT

The sound producing device includes a shutter element configured to obscure an aperture positioned to receive an amplitude-modulated acoustic wave; a blind element, wherein the aperture is formed within the blind element; and an amplitude-modulation means, configured to generate an amplitude-modulated acoustic wave toward the aperture; wherein the amplitude-modulated acoustic wave is produced according to an input audio signal.

9 Claims, 3 Drawing Sheets

(56) References Cited

U.S. PATENT DOCUMENTS

| | | | | | |
|---|---|---|---|---|---|
| 11,343,609 | B2 * | 5/2022 | Margalit | ................ | H04R 19/02 |
| 12,107,546 | B1 * | 10/2024 | Liang | ..................... | H03D 7/165 |
| 2016/0360321 | A1 * | 12/2016 | Margalit | ................ | H04R 19/02 |
| 2017/0064457 | A1 * | 3/2017 | Kupershmidt | ......... | H04R 19/02 |
| 2022/0183659 | A1 * | 6/2022 | Margalit | .............. | A61B 8/5207 |
| 2023/0247357 | A1 * | 8/2023 | Margalit | ................ | H04R 19/02 |
| | | | | | 381/98 |

* cited by examiner

SOUND PRODUCING DEVICE AND METHOD

CROSS REFERENCE TO RELATED APPLICATIONS

This application claims the benefit of U.S. Provisional Application No. 63/540,937, filed on Sep. 28, 2023. The content of the application is incorporated herein by reference.

BACKGROUND OF THE INVENTION

1. Field of the Invention

The present application relates to a sound producing device and a sound producing method, and more particularly, to a sound producing device and a sound producing method free from harmonic distortion and inter-modulation distortion.

2. Description of the Prior Art

Loudspeaker design has changed little in nearly a century. A loudspeaker (or "speaker") is an electro-acoustic transducer that produces sound in response to an electrical signal input. The electrical signal causes a vibration of the speaker cone in relation to the electrical signal amplitude.

Speaker may operate in ultrasonic frequency. Previous ultrasonic speakers suffer from harmonic distortion and inter-modulation distortion, which degrades sound quality.

Therefore, it is necessary to improve the prior art.

SUMMARY OF THE INVENTION

It is therefore a primary objective of the present application to provide a sound producing device and method, to improve over disadvantages of the prior art.

An embodiment of the present application discloses a sound producing device. The sound producing device comprises a shutter element configured to obscure an aperture positioned to receive an amplitude-modulated acoustic wave; a blind element, wherein the aperture is formed within the blind element; and an amplitude-modulation means, configured to generate an amplitude-modulated acoustic wave toward the aperture; wherein the amplitude-modulated acoustic wave is produced according to an input audio signal.

An embodiment of the present application discloses a sound producing method applied for a sound producing device. The sound producing method comprises applying a first control signal on an amplitude-modulation means, such that the amplitude-modulation means produces an amplitude-modulated acoustic wave toward an aperture, wherein the first control signal is generated according to an input audio signal; applying a second control signal on a shutter element or a blind element, wherein the second control signal is irrelevant to the input audio signal; wherein the sound producing device comprises the shutter element, the blind element and the amplitude-modulation means; wherein the aperture is formed within the blind element; wherein the shutter element obscures the aperture positioned to receive the amplitude-modulated acoustic wave.

An embodiment of the present application discloses a sound producing method applied for a sound producing device. The sound producing method comprises an amplitude-modulation means producing an amplitude-modulated acoustic wave toward an aperture; and a shutter element or a blind element performing a compressed-and-expanded movement; wherein the sound producing device comprises the shutter element (201), the blind element (102) and the amplitude-modulation means; wherein the aperture is formed within the blind element (102); wherein the shutter element (201) obscures the aperture (120) positioned to receive the amplitude-modulated acoustic wave.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
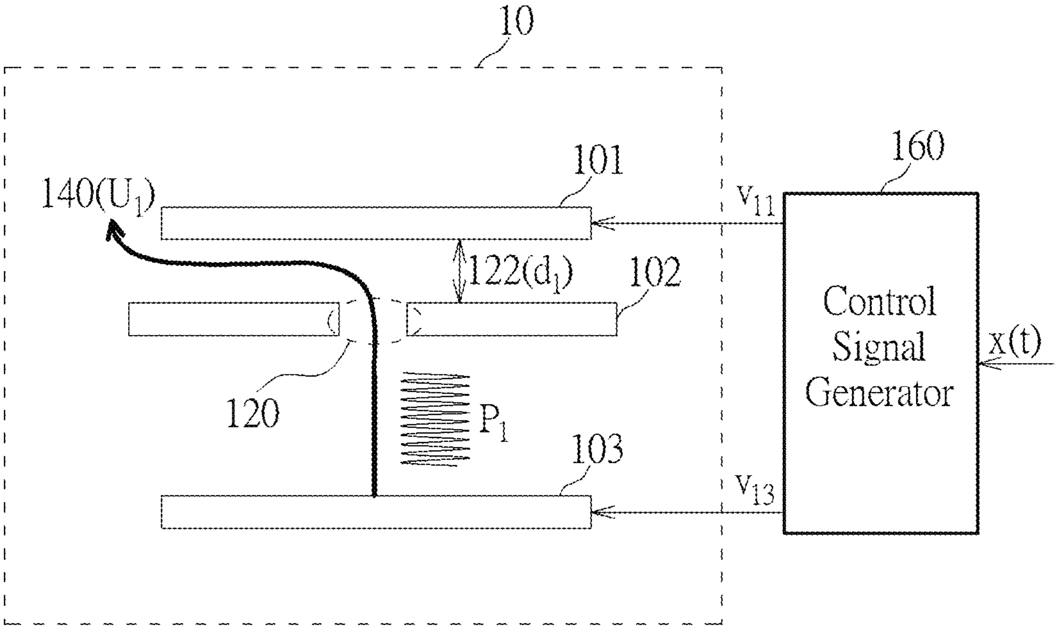
FIG. 1 (Prior Art)
FIG. 1 is a schematic diagram of a sound producing device (SPD) in the art.

FIG. 1 illustrates a schematic diagram of a sound producing device (SPD) 10 in the art, similar to one disclosed in U.S. Pat. No. 9,913,048. The SPD 10 comprises a shutter element 101, a blind element 102 and an oscillation element 103. The shutter element 101, the blind element 102 and the oscillation element 103 may be silicon membrane fabricated using MEMS technology. The oscillation element 103 receives a control signal $v_{13}$ so as to generate a constant-amplitude acoustic wave $P_1$, as ultrasonic carrier signal, toward a direction orthogonal to a surface of the oscillation element 103. In an embodiment, the constant-amplitude acoustic wave $P_1$ may be expressed as $P_1=P_0\cdot\sin(2\pi f_c t+\varphi_1)$, where $P_0$ is constant, $f_c$ is ultrasonic carrier frequency and $\varphi_1$ represents phase of $P_1$. The constant amplitude wave P1 passes through an aperture 120 formed within the blind element 102 and through a gap/passage 122 between the shutter element 101 and the blind element 102, and radiates outward as an acoustic wave 140. A chamber may be formed between the oscillation element 103 and the blind element 102, and walls of the chamber are omitted for brevity.

The shutter element 101 (or the blind element 102) receives a control signal $v_{11}$ and vibrates accordingly. In an embodiment, the gap distance $d_1$ may be expressed as $d_1=d_0\cdot[1+A_x\cdot x(t)\cdot\sin(2\pi f_c t+\varphi_2)]$, where x(t) is an audible source signal or an input audio signal within an audible band, φ2 represent a phase, do is a natural spacing between shutter element 101 and blind element 102 when neither of them is driven, $A_x$ is a parameter (related to modulation depth) to control the dynamic range so that $|A_x\cdot x(t)|<1$.

For the SPD 10, the control signal vi is generated according to the input audio signal x(t). Suppose displacement of the shutter element 101 is proportional to the control signal $v_{11}$, the control signal $v_{11}$ may comprise a component related to $x(t)\cdot\sin(2\pi f_c t+\varphi_2)$. On the contrary, in order to generate the constant-amplitude acoustic wave $P_1$, the control signal $v_{13}$ may comprise a component related to $\sin(2\pi f_c t+\varphi_1)$. Note that, the control signal $v_{13}$ comprises no component which is related to x(t).

The x(t)-relevant control signal $v_{11}$ and the x(t)-irrelevant control signal $v_{13}$ may be generated according to a control signal generator 160. The shutter element 101 and the oscillation element 103 may be coupled to the control signal generator 160.

By controlling the gap distance $d_1$ between the shutter element 101 and the blind element 102 in a time varying manner, an output acoustic wave 140 may be a kind of amplitude modulated acoustic wave. Specifically, the gap 122 would introduce an acoustic resistance $R_1$ and the output acoustic wave 140 would have an output volume velocity $U_1$ as $U_1=P_1/R_1$. Since $R_1$ is related to $d_1$ and $d_1$ comprises component related to x(t), $U_1$ comprises component related to x(t). Hence, the SPD 10 is able to produce sound related to x(t).

However, the construct of the SPD 10 brings harmonic distortion and inter-modulation distortion. It is mainly because the $U_1$ comprises cubic term of x(t), which is nonlinear with respect to x(t).

According to Carl Poldy, Tutorial AES 120, Appendix A.3, Paris, May 2006, the acoustic resistance of the acoustic passage 122 is approximately proportional to a reciprocal of a cube of $d_1$, i.e., $R_1 \propto 1/(d_1)^{-3}$. The output volume velocity $U_1$ would be $$U_1=P_1/R_1 \propto P_0 \cdot \sin(2\pi f_c t+\varphi_1) \cdot d_1^3 \quad \text{(eq. 2.1)}$$

$$=P_0 \cdot \sin(2\pi f_c t+\varphi_1) \cdot d_0^3[1+A_x \cdot x(t) \cdot \sin(2\pi f_c t+\varphi_2)]^3 \quad \text{(eq. 2.2).}$$

Note that, a cubic term of x(t) is embedded inside a component of $U_1$. Illustratively, assuming $\varphi_1=\varphi_2=0$, $U_1$ can be expressed as $U_1=U_0 \sin\theta[1+A_x\, x(t) \sin\theta]^3$ (eq. 3), where $\theta$ represents $2\pi f_c t$, i.e., $\theta=2\pi f_c t$, and $U_0$ represents a peak level of the output volume velocity wave $U_1$ when none of the elements 101, 102, 103 is driven. By applying a demodulation operation and/or applying a filtering operation to capture component within an audible spectrum band, a resulting component y(t), which may be expressed as (eq. 4), shall be obtained. Note that, (eq. 4) is derived by expanding right-hand-side of (eq. 2.2) and thus (eq. 5) is obtained. Note that, the signal component of $U_1/U_0$ within (eq. 5) which would fall/lie within the audible spectrum band is to terms in the $2^{nd}$ square bracket within the curly brace of (eq. 5), where a cubic term of x(t) is included therein.

$$y(t) \triangleq \text{audible\_band\_filtered}\left[\frac{U_1}{U_0}\right] = \frac{3}{2}A_x x(t) + \frac{3}{8}A_x^3 x^3(t). \quad \text{(eq. 4)}$$

$$\frac{U_1}{U_0} = \quad \text{(eq. 5)}$$

$$\sin\theta n\left\{\left[1+\frac{3}{2}A_x^2x^2(t)\right]+\left[3A_x x(t)+\frac{3}{4}A_x^3x^3(t)\right]\sin\theta+\left[-\frac{3}{2}A_x^2x^2(t)\right]\right.$$
$$\left.\cos 2\theta+\left[-\frac{1}{4}A_x^3x^3(t)\right]\sin 3\theta\right\}.$$

One of the root causes of significant total distortion in the sound produced by the device in SPD 10 is that the audible source signal x(t) shows up as a factor in the control signal that modifies acoustic resistance related to the acoustic output nonlinearly. One remedy to lower the distortion in the reproduced sound is to avoid including the audible band source in the control signal that will alter an acoustic property (e.g., acoustic resistance) nonlinearly.

Figure 2:
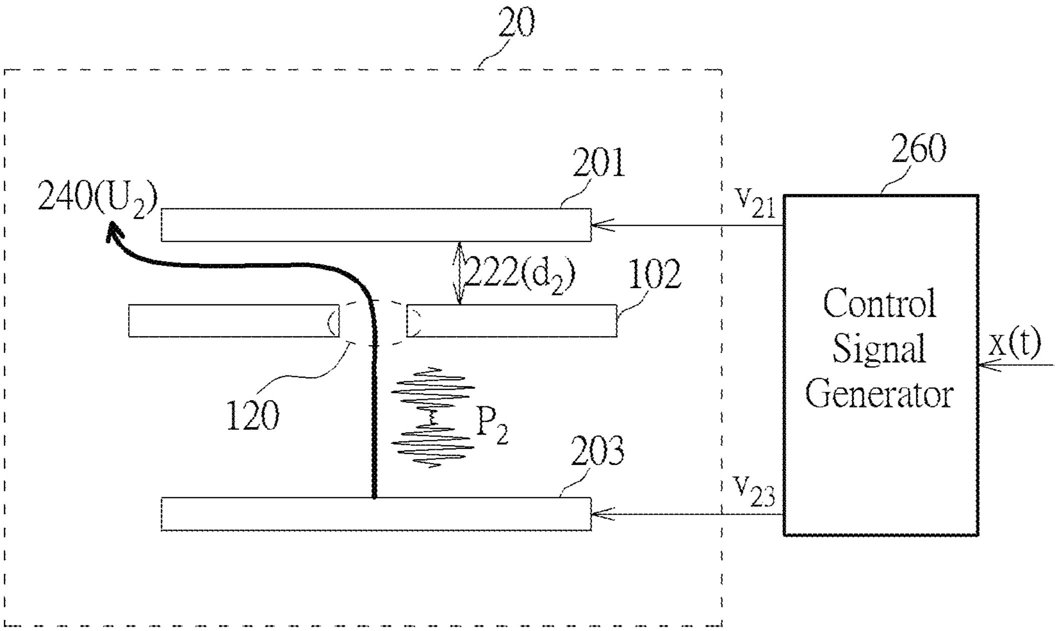
FIG. 2 is a schematic diagram of an SPD according to an embodiment of the present application.

FIG. 2 illustrates a schematic diagram of an SPD 20 according to an embodiment of the present application. SPD 20 is similar to SPD 10, and thus, same components are denoted by same notations. The SPD 20 comprises a shutter element 201, the blind element 102 and an oscillation element 203. Instead of generating the constant-amplitude acoustic wave $P_1$, the oscillation element 203, driven by a control signal $v_{23}$, is configured to generate an amplitude-modulated acoustic wave $P_2$ toward the aperture 120 or toward a direction orthogonal to a surface of the oscillation element 203 (which may be regarded as a modulation operation). That is, an amplitude of the acoustic wave $P_2$ is corresponding to the input audio signal x(t). The shutter element 201, driven by a control signal $v_{21}$ and configured to obscure the aperture 120 positioned to receive the amplitude-modulated acoustic wave $P_2$, may perform a constant amplitude or x(t)-irrelevant oscillation/vibration (which may be regarded as a demodulation operation), such that an acoustic wave 240 is produced and radiates outward.

The x(t)-irrelevant control signal $v_{21}$ and the x(t)-relevant control signal $v_{23}$ may be generated according to a control signal generator 260. The shutter element 201 and the oscillation element 203 may be coupled to the control signal generator 260.

The amplitude-modulated acoustic wave $P_2$ may be regarded as double sideband with suppressed carrier (DSB-SC) modulated (see (eq. 6) below). In an embodiment, driving circuit disclosed in U.S. application Ser. No. 18/665,525 may be included in the control signal generator 260, especially for generating the control signal $v_{23}$, but not limited thereto.

In an embodiment, the control signal $v_{23}$ may drive the oscillation element 203 such that the amplitude-modulated acoustic wave $P_2$, as illustrated in FIG. 2. In an embodiment, $P_2$ may be expressed as $P_2=P_0\, x(t) \sin(2\pi f_c t)$ (eq. 6) (neglecting phase for brevity), which is x(t)-relevant. On the other hand, the control signal $v_{21}$ may drive the shutter element 201 such that a gap distance $d_2$ corresponding to a gap 222 between the shutter element 201 and the blind element 102 may be expressed as $d_2=d_0 \cdot [1+A_d \cdot \sin(2\pi f_c t)]$ (eq. 7) (neglecting phase for brevity), which is x(t)-irrelevant, where parameter Aa parameterizes the maximum displacement of the shutter element 201 with $|A_d|<1$. The acoustic resistance $R_2$ corresponding to the gap 222 or the gap distance $d_2$ may be expressed as (eq. 8). Given that, the output volume velocity $U_2$ may be expressed as (eq. 9).

$$R_2 = R_0[1+A_d\sin(2\pi f_c t)]^{-3} = \quad \text{(eq. 8)}$$
$$R_0\left\{\left[1+\frac{3A_d^2}{2}\right]+\left[3A_d+\frac{3A_d^3}{4}\right]\sin(2\pi f_c t)+\left[-\frac{3A_d^2}{2}\right]\cos(2\pi 2 f_c t)+\left[-\frac{A_d^3}{4}\right]\sin(2\pi 3 f_c t)\right\}^{-1}$$

$$\frac{U_2}{U_0} = x(t)\sin(2\pi f_c t) \quad \text{(eq. 9)}$$
$$\left\{\left[1+\frac{3A_d^2}{2}\right]+\left[3A_d+\frac{3A_d^3}{4}\right]\sin(2\pi f_c t)+\left[-\frac{3A_d^2}{2}\right]\cos(2\pi 2 f_c t)+\left[-\frac{A_d^3}{4}\right]\sin(2\pi 3 f_c t)\right\}$$

In (eq. 8), no x(t) term is shown therein. In (eq. 9), those four terms in the curly brackets on the right-hand-side may be seen as four processes in parallel to demodulate the amplitude-modulated signal $x(t) \sin(2\pi f_c t)$. The $1^{st}$ term is simply a gain of $1+3A_d^2/2$, and it produces an output within an ultrasonic band $[f_c-BW, f_c+BW]$ that is above audible frequencies. Herein BW denotes audible spectrum bandwidth, e.g., BW=20 KHz or 24 KHz for high resolution audio application, but not limited thereto. The $2^{nd}$ term is to demodulate $x(t) \sin(2\pi f_c t)$ into two parts: one within the band [0, BW] that is audible and proportional to x(t), and the other within an ultrasonic band $[2f_c-BW, 2f_c+BW]$ that is not/beyond perceivable. The $3^{rd}$ term converts $x(t) \sin(2\pi f_c t)$ into two parts, one within an ultrasonic band $[f_c-BW, f_c+BW]$ and the other within another ultrasonic band $[3f_c-BW, 3f_c+BW]$. Neither of them in the 3rd term is perceivable. The 4th term converts $x(t) \sin(2\pi f_c t)$ into two parts, one within an ultrasonic band $[2f_c-BW, 2f_c+BW]$ and the other within another ultrasonic band $[4f_c-BW, 4f_c+BW]$. Neither part in the 4th term is perceivable.

Note that, only the term of $[3A_d+3A_d^3/4]$ in the $2^{nd}$ square bracket within the curly brace of $U_2/U_0$ in of (eq. 9) would be related to component within the audible spectrum band, and no cubic term of x(t) is included in the $[3A_d+3A_d^3/4]$ term. The resulting component y(t) is therefore derived as (eq. 10), which is linear with respect to x(t), the input audio signal.

$$y(t) \triangleq \text{audible\_band\_filtered}\left[\frac{U_2}{U_0}\right] = \left[\frac{3}{2}A_d + \frac{3A_d^3}{8}\right]x(t) \qquad \text{(eq. 10)}$$

As can be seen from (eq. 10), resulting component y(t) is linear with respect to the input audio signal x(t), and thus total harmonic distortion (THD) and total distortion (TD) no longer exist, analytically.

Figure 3:
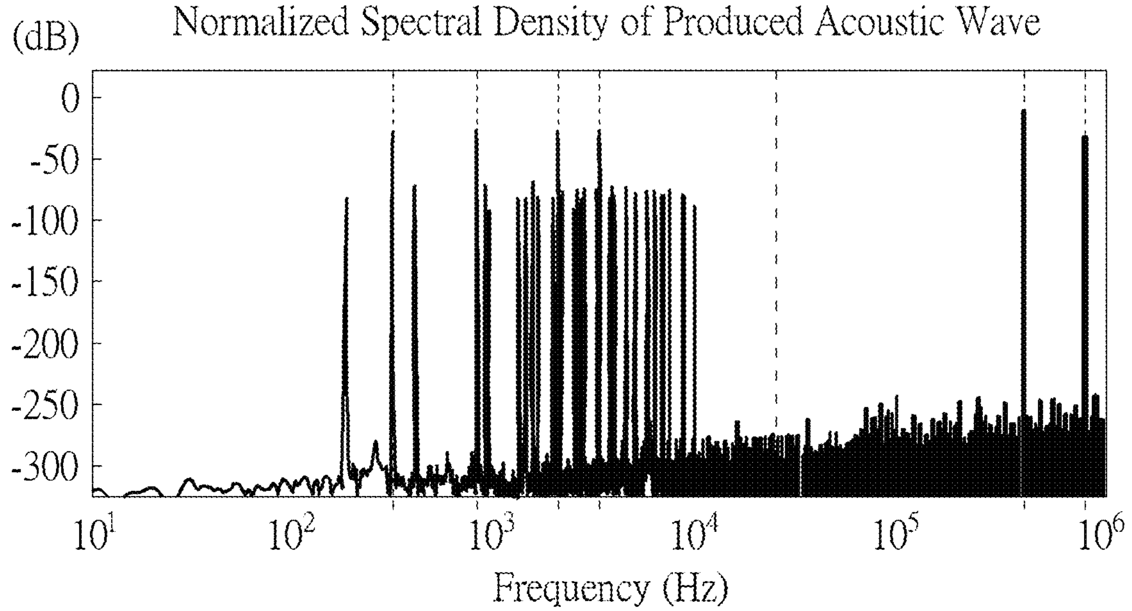
FIG. 3 illustrates spectral density of an acoustic wave produced by the SPD shown in FIG. 1.
Figure 4:
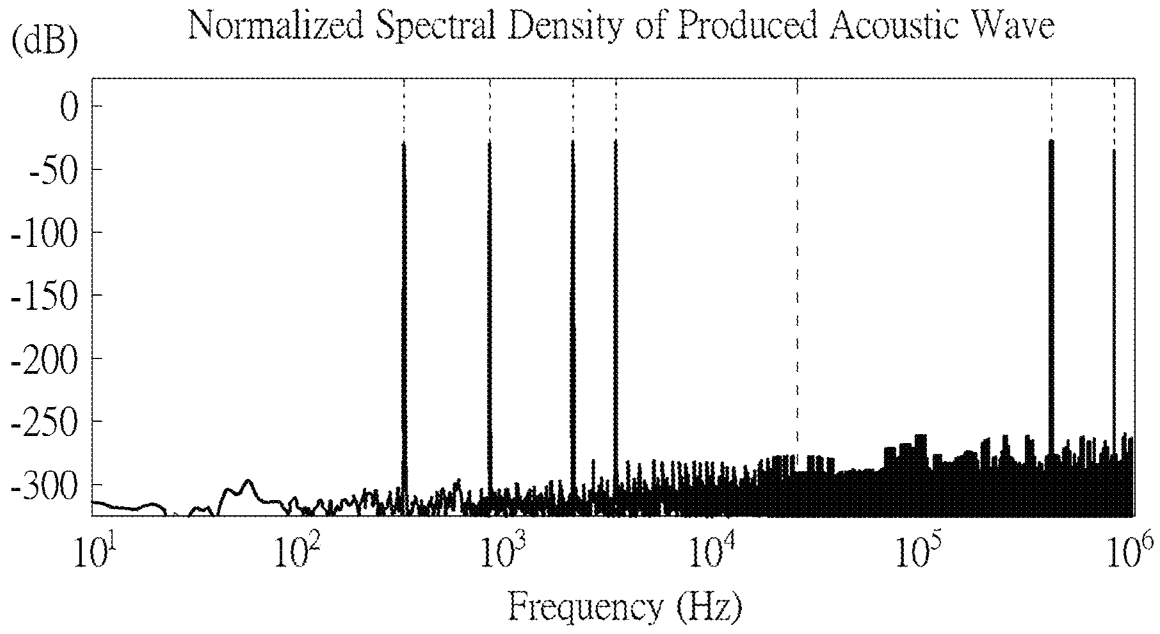
FIG. 4 illustrates spectral density of an acoustic wave produced by the SPD shown in FIG. 2.

Numerically, please refer to FIG. 3 and FIG. 4 (as a glimpse). FIG. 3 illustrates (normalized) spectral density of the acoustic wave 140 produced by SPD 10, and FIG. 4 illustrates (normalized) spectral density of acoustic wave 240 produced by SPD 20. In FIG. 3 and FIG. 4, the dotted lines indicate audible bandwidth BW as 24 KHz. x(t) is set to be a 4-tone signal at {310, 800, 2000, 3200} Hz, $A_x$=0.4 for FIG. 3 and $A_d$=0.4 for FIG. 4 are employed in the simulation environment.

It can be also seen from FIG. 3, the acoustic wave 140 would have inter-modulated components/interference which would fall/lie within the audible spectrum band, and thus total distortion increases. On the other hand, the acoustic wave 240, produced by SPD 20, has no THD and TD. Note that, the noise floors showing up in FIG. 4 with levels below roughly −270 dB arise from numerical errors of digital computer.

Furthermore, TABLE I tabulates the $3^{rd}$ harmonic distortion $HD_3$ and total distortion TD for various x(t), where x(t) may be single tone or multi-tone signal, with $A_x$=0.4 and $A_x$=0.9 for the SPD 10.

TABLE I

| | $A_x = 0.4$ | | $A_x = 0.9$ | |
|---|---|---|---|---|
| x(t) | $HD_3$ | TD | $HD_3$ | TD |
| 1-tone 1000 Hz | 0.97% (−40.26 dB) | 0.97% (−40.26 dB) | 4.40% (−27.14 dB) | 4.40% (−27.14 dB) |
| 2-tone {700, 1100} Hz | 0.24% (−52.23 dB) | 1.07% (−39.45 dB) | 1.14% (−38.89 dB) | 4.95% (−26.10 dB) |
| 3-tone {700, 1000, 1300} Hz | 0.45% (−46.96 B) | 1.13% (−38.97 dB) | 2.10% (−33.58 dB) | 5.26% (−25.59 dB) |
| 4-tone {310, 800, 2000, 3200} Hz | 0.22% (−53.07 dB) | 1.01% (−39.91 dB) | 1.06% (−39.49 dB) | 4.83% (−26.33 dB) |
| 8-tone {60, 116, 224, 432, 834, 1610, 3108, 6000} Hz | 0.11% (−59.16 dB) | 0.58% (−44.79 dB) | 0.54% (−45.32 dB) | 2.84% (−30.95 dB) |

$HD_3$ and TD may be elaborated as follow. In general, the tones in the output are classified in three groups. Group 1 represents fundamental frequencies, which exist in the input signal. Group 2 represents harmonic frequencies, which are multiple of any of the fundamental frequencies. These tones in Group 2 account for the harmonic distortion. Group 3 represents any frequencies other than the fundamental or harmonic frequencies. These tones in Group 3 account for the inter-modulation distortion.

As quality of sound produced by a speaker/SPD may be accessed through performance metrics such as harmonic distortions ($HD_n$ and THD) and total distortion (TD), $HD_n$, THD and TD may be defined as follows:

$$HD_n(n\text{-}th\ \text{Harmonic Distortion}) \triangleq \frac{\text{RMS}\{\sum(\text{all } n\text{-}th \text{ harmonics of funfamental frequencies})\}}{\text{RMS}\{\sum(\text{all compenents in Group 1})\}}$$

$$THD(\text{Total Harmonic Distortion}) \triangleq \frac{\text{RMS}\{\sum(\text{All components in Group 2})\}}{\text{RMS}\{\sum(\text{All components in Group 1})\}}$$

$$TD(\text{Total Distortion}) \triangleq \frac{\text{RMS}\{\sum(\text{All components in Group 2 and 3})\}}{\text{RMS}\{\sum(\text{All components in Group 1})\}}$$

It should be noted that all the summations in the above definitions are carried over audible frequency range, i.e., [0, BW], e.g., [0 Hz, 24 kHz]. RMS represents root mean square operation.

Several observations are obtained via numerical simulations corresponding to SPD 10. As the number of tones in the source signal increases, the number of inter-modulated components grows rapidly in the output acoustic wave. In addition, as $A_x$ increases, the levels of the fundamental components in the output acoustics increase nonlinearly and the levels of the 3rd-harmonic components and the inter-modulated components increase as well.

Above are THD and TD results for SPD 10. As for SPD 20, under same simulation scenario, there are no harmonic components or inter-modulated components within the audible band of the resulting component y (t) produced by SPD 20. That is, SPD 20 produces the acoustic wave 240 with THD=TD=0. Quality of sound of SPD 20 significantly outperforms which of SPD 10.

Note that, the x(t)-irrelevant control signal $v_{21}$ applied to the shutter element (e.g., 201) is merely for illustration purpose, which is not limited thereto. For example, the x(t)-irrelevant control signal $v_{21}$ may be applied to the blind element (e.g., 102) as well. As long as (the gap (e.g., 222)

between) the shutter and blind elements perform a compressed-and-expanded movement at an ultrasonic carrier frequency (e.g., $f_c$), e.g., an amplitude or a time-variant function of the gap distance is irrelevant to x(t) such as the one shown as (eq. 7), requirements of the present application is satisfied, which is within the scope of the present application.

Figure 5:
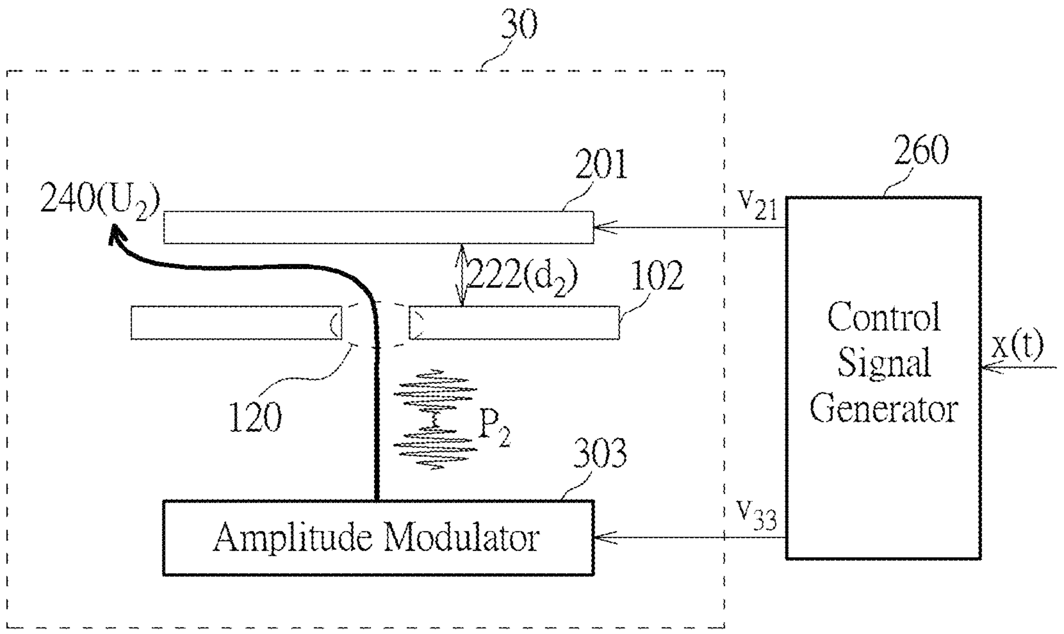
FIG. 5 is a schematic diagram of an SPD according to an embodiment of the present application.

Furthermore, using the (MEMS-fabricated) oscillation element (e.g., 203) to produce the amplitude-modulated acoustic wave $P_2$ is merely for illustration purpose, which is not limited thereto. For example, any kind of amplitude-modulation means or amplitude modulator (e.g., 303 shown in FIG. 5) capable of generating amplitude-modulated acoustic wave (modulated according to x(t) such as the one shown as (eq. 6)) may be employed within the SPD of the present application. The amplitude-modulation means or amplitude modulator 303 may comprise (MEMS-fabricated) oscillation element, diaphragm, film, coil, membrane, piston, etc. As long as the amplitude-modulation means or amplitude modulator can generate amplitude-modulated acoustic wave, requirements of the present application is satisfied, which is within the scope of the present application.

By avoiding the audible band source in the control signal that will alter acoustic property (e.g., acoustic resistance) nonlinearly, in the present application, the audio sound is produced by generating amplitude-modulated acoustic wave according to the audible band source (input audio signal) and performing compressed-and-expanded movement which is irrelevant to the audible band source. Analytical and numerical results demonstrate not only input-output linearity but also harmonic distortion and inter-modulation distortion vanish. Therefore, sound quality of SPD of the present application would be significantly enhanced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A sound producing device, comprising:
- a shutter element, configured to obscure an aperture positioned to receive an amplitude-modulated acoustic wave;
- a blind element, wherein the aperture is formed within the blind element; and
- an amplitude-modulation means, configured to generate an amplitude-modulated acoustic wave toward the aperture;
- wherein the amplitude-modulated acoustic wave is produced according to an input audio signal;
- wherein the shutter element or the blind element receives a first control signal;
- wherein the first control signal is irrelevant to the input audio signal.

2. The sound producing device of claim 1,
- wherein the amplitude-modulation means receives a second control signal;
- wherein the second control signal is generated according to the input audio signal, such that the amplitude-modulated acoustic wave is produced according to the input audio signal.

3. The sound producing device of claim 1,
- wherein the shutter element or the blind element is driven by the first control signal, such that a gap between the shutter element and the blind element is compressed-and-expanded at an ultrasonic carrier frequency of the amplitude-modulated acoustic wave.

4. The sound producing device of claim 1,
- wherein a time-variant function of a gap distance of the gap between the shutter element and the blind element is irrelevant to the input audio signal.

5. The sound producing device of claim 1,
- wherein the amplitude-modulation means comprises an oscillation element;
- wherein the oscillation element produces the amplitude-modulated acoustic wave toward a direction orthogonal to a surface of the oscillation element.

6. The sound producing device of claim 1,
- wherein the shutter element or the blind element is driven by the first control signal which is irrelevant to the input audio signal.

7. A sound producing method, applied for a sound producing device, the sound producing method comprising:
- applying a first control signal on an amplitude-modulation means, such that the amplitude-modulation means produces an amplitude-modulated acoustic wave toward an aperture, wherein the first control signal is generated according to an input audio signal;
- applying a second control signal on a shutter element or a blind element, wherein the second control signal is irrelevant to the input audio signal;
- wherein the sound producing device comprises the shutter element, the blind element and the amplitude-modulation means;
- wherein the aperture is formed within the blind element;
- wherein the shutter element obscures the aperture positioned to receive the amplitude-modulated acoustic wave.

8. A sound producing method, applied for a sound producing device, the sound producing method comprising:
- an amplitude-modulation means producing an amplitude-modulated acoustic wave toward an aperture; and
- a shutter element or a blind element performing a compressed-and-expanded movement;
- wherein the sound producing device comprises the shutter element, the blind element and the amplitude-modulation means;
- wherein the aperture is formed within the blind element;
- wherein the shutter element obscures the aperture positioned to receive the amplitude-modulated acoustic wave;
- wherein the shutter element or the blind element receives a control signal;
- wherein the control signal is irrelevant to the input audio signal.

9. The sound producing method of claim 8, comprising:
- producing, by the amplitude-modulation means, the amplitude-modulated acoustic wave according to an input audio signal at an ultrasonic frequency; and
- the shutter element or the blind element performing the compressed-and-expanded movement at the ultrasonic frequency;
- wherein the compressed-and-expanded movement is irrelevant to the input audio signal.

* * * * *